Oct. 26, 1948.  J. ROSAN  2,452,262
FLUID SEAL FOR INSERTS
Filed Dec. 18, 1944
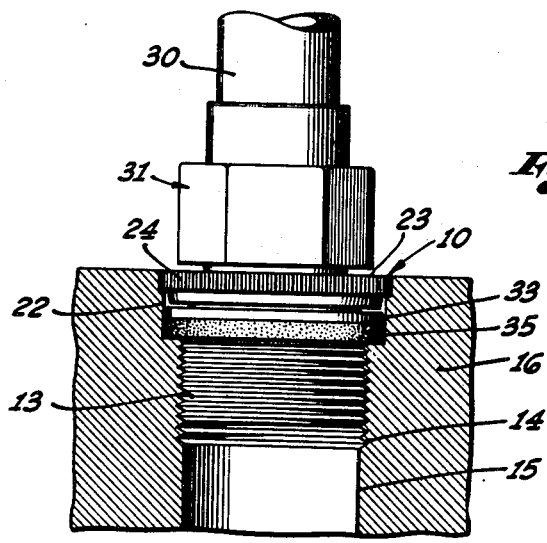
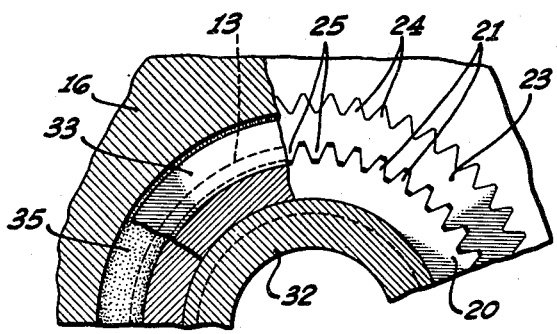
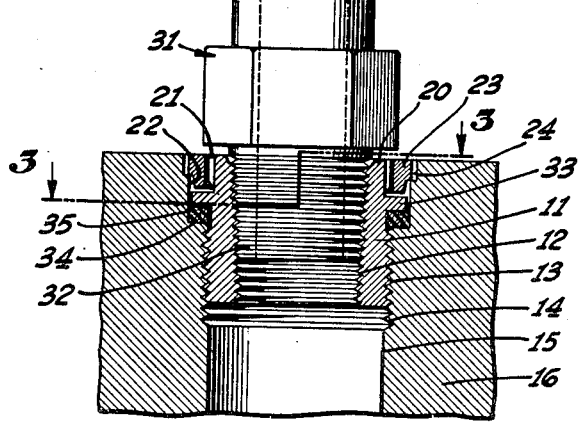
INVENTOR.
JOSEPH ROSAN,
BY
ATTORNEY.

Patented Oct. 26, 1948

2,452,262

UNITED STATES PATENT OFFICE 2,452,262

FLUID SEAL FOR INSERTS

Joseph Rosan, North Hollywood, Calif.

Application December 18, 1944, Serial No. 568,589

2 Claims. (Cl. 285—39)

This invention relates generally to inserts designed for anchorage in bores of bodies of relatively soft materials, such as aluminum and magnesium alloys, various plastics and woods, as well as certain relatively harder materials such as cast iron, for such typical purposes as making various connections with such bodies, as set forth in my United States patent application, Serial No. 466,855, filed November 25, 1942, for Insert, now Patent No. 2,400,318. More particularly, the present invention deals with the incorporation in such an insert of means for effecting a novel and improved fluid seal between the insert and the bore of the body into which the insert is installed.

In some instances, inserts of the type mentioned are employed to make a fluid connection with a bore in the relatively soft body. In such situations, particularly where the fluid pressure is substantial, it becomes essential to provide the insert with a fluid sealing means. Various expedients have been tried in the past, but have had certain shortcomings not necessary to detail herein.

It is accordingly the primary object of the present invention to provide an insert of the class mentioned with a fluid sealing means by which a simple and effective fluid seal may be effected, even against extreme fluid pressures.

The invention may best be described without further preliminary discussion by referring now to the following detailed description of an insert incorporating the features of the present invention, reference for this purpose being had to the accompanying drawings:

Fig. 1 is a side elevation of an insert in accordance with the invention shown installed in a body of material and to which has been coupled a fluid line, the body of material being shown in section;

Fig. 2 is a view similar to Fig. 1, but showing the insert in longitudinal medial section; and Fig. 3 is a section taken on broken line 3—3 of Fig. 2.

In the drawings, numeral 10 designates generally an insert of the class referred to, and comprising in this instance a tubular body 11, provided internally with tapered threads 12, and externally with an inner or lower screw threaded section 13, adapted for engagement with complementary screw threads 14 formed in bore 15 of body 16, which latter will be understood to be of a material relatively softer than the presently described locking ring.

The outer or upper end portion or head 20 of the insert is provided with a plurality of vertically extending splines or serrations 21. The bore for the insert is counterbored as at 22, and a locking ring 23, having a plurality of splines or serrations 24 occupying its external periphery and a plurality of splines or serrations 25 occupying its inner periphery is provided. The root diameter of exterior splines 24 corresponds with the diameter of the counterbore 22, and the interior splines 25 are designated to mate or mesh with the splines 21 on the head of the tubular body 11. The tubular body 11 having been installed into a flush position with body 16, as illustrated in Fig. 2, the interior serrations of the locking ring are meshed with the serrations 21 on head 20, and the locking ring 23 is then pressed or hammered inwardly, the exterior serrations 24 broaching their way into the wall of the counterbore to the position clearly illustrated in Fig. 2. The tubular insert body 11 is thus anchored in the relatively soft body 16, the threads 13 resisting axial displacement, and the locking ring 23 broached into the body 16 resisting rotative displacement. For a more particular description of the parts so far described, reference is directed to my aforesaid application Serial No. 466,855.

Numeral 30 designated generally a fluid tubing coupled to the insert by a coupling device 31 of any desired type, and involving in this instance a tapered, screwthreaded male coupling element 32 engaged with the internal screwthreads 12 of the tubular insert body.

To seal against possible leakage from bore 15 around the outside of the insert, the following provisions are made. Tubular insert body 11 is provided between its aforementioned serrated head 20 and threaded section 13, with an external annular flange 33, of a diameter to be receivable freely within counterbore 22. As will be evident from the drawings, this flange 33 underlies locking ring 23 and overlies the upwardly facing annular shoulder 34 at the juncture of counterbore 22 with bore 15. Below flange 33, and resting on shoulder 34, is a fluid sealing ring 35, typically and preferably, though not necessarily, in the form of a soft synthetic rubber ring of a conventional type, and which, in its uncompressed condition, may have either a rectangular cross-section, or a circular cross-section, as in the familiar O-ring. As will be evident from comparison of Fig. 3 with the disclosure of my aforesaid application Serial No. 466,855, counterbore 22 is drilled to somewhat greater depth than has been indicated in the prior application in order to accommodate the flange 33 and sealing ring 35. Sealing ring 35 is compressed and wedged into the cavity afforded for it at the time the insert body 11 is screwed into bore 15. Any fluid tending to leak from the bore 15 outwardly past threaded section 12 meets the sealing ring and compresses the ring 35 more tightly, and fluid pressures of extreme values are effectively held.

It will be evident that the fluid seal as thus provided is characterized by extreme simplicity, adds but little expense to the device, is incorporated with the structure of the insert without the necessity of substantial modification of its basic structure, and is at the same time of a type capable of holding an extreme fluid pressure.

It will be understood that the drawings and description are to be taken merely as illustrative of and not restrictive of the broad invention and that various changes in design, structure and arrangement may be made without departing from the spirit and scope of the invention or of the appended claims.

I claim:

1. In an insert adapted to be installed in a screw-threaded and counterbored socket in a body to form a fluid-tight connection therewith, the combination of a cylindrical body having external screw threads on the lower portion thereof adapted to fit the screw threads of said socket, a plurality of circumferentially spaced, longitudinally extending serrations on the external upper portion of said body, a radial flange projecting outwardly from said body intermediate said upper and lower portions, a resilient annular sealing ring disposed between said flange and the shoulder formed at the junction of said counterbore with said socket, said ring being compressed between said flange and said shoulder to form a fluid-tight seal between said insert and said body, a locking ring having internal serrations mating with and slidable on the serrations of said insert body, and a plurality of axially extending broaching serrations formed on the outer periphery of said ring, said broaching serrations being adapted to broach the walls of said counterbore when said ring is driven down over said insert body, thereby locking said insert body against rotation.

2. In an insert adapted to be installed in a screw-threaded and counterbored socket in a body to form a fluid-tight connection between said socket and a fluid pipe line, the combination of a tubular body having external screw threads on the lower portion thereof adapted to fit the screw threads of said socket, means for connecting said pipe line to said insert body whereby said line is in communication with said socket, a plurality of longitudinally extending serrations on the external upper portion of said body, a radial flange projecting outwardly from said body intermediate said upper and lower portions, a resilient annular sealing ring disposed between said flange and the bottom of said counterbore, said ring being compressed by said flange to form a fluid-tight seal between said insert and said body, a locking ring having serrations mating with and slidable on the serrations of said insert body, and a plurality of axially extending broaching serrations formed on the outer periphery of said ring, said broaching serrations being adapted to broach the side walls of said counterbore when said ring is driven down over said insert body, thereby locking said insert body against rotation.

JOSEPH ROSAN.

REFERENCES CITED

The following references are of record in the file of this patent:

UNITED STATES PATENTS

| Number | Name | Date |
| --- | --- | --- |
| 408,320 | Powell | Aug. 6, 1889 |
| 879,604 | Wawrizinski | Feb. 18, 1908 |
| 1,616,996 | Talaga | Feb. 8, 1927 |
| 1,643,034 | Sirl | Sept. 20, 1947 |
| 1,701,816 | Malluk | Feb. 12, 1929 |
| 1,708,736 | Palady | Apr. 9, 1929 |
| 2,118,648 | Johnson | May 24, 1938 |
| 2,370,944 | Emerson | Mar. 6, 1945 |

FOREIGN PATENTS

| Number | Country | Date |
| --- | --- | --- |
| 665,046 | Germany | Sept. 15, 1938 |
| 116,236 | Great Britain | June 6, 1918 |
| 385,732 | Great Britain | Jan. 5, 1933 |